United States Patent
Cheng-Lung et al.

(10) Patent No.: US 8,408,416 B2
(45) Date of Patent: Apr. 2, 2013

(54) CRATE WITH BLOW-MOLDED BASE

(75) Inventors: Wu Cheng-Lung, South ZhongShan (CN); Todd M. Jakubowski, Rutland, VT (US); Chris Jakubowski, Rutland Town, VT (US); Scott Jakubowski, Castleton, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 765 days.

(21) Appl. No.: 12/639,523

(22) Filed: Dec. 16, 2009

(65) Prior Publication Data

US 2010/0200580 A1  Aug. 12, 2010

Related U.S. Application Data

(60) Provisional application No. 61/151,892, filed on Feb. 12, 2009.

(51) Int. Cl.
B65D 6/08 (2006.01)
(52) U.S. Cl. ............ 220/495; 220/6; 220/666; 119/481
(58) Field of Classification Search ............... 119/474, 119/480, 481, 498, 499, 501, 416, 152, 153, 119/47, 482; 220/666, 4.28, 6, 7, 485, 489, 220/494, 495, 23.91
See application file for complete search history.

(56) References Cited

U.S. PATENT DOCUMENTS

| | | | |
|---|---|---|---|
| 2,542,920 A * | 2/1951 | Gardner | 220/7 |
| 3,195,506 A | 7/1965 | Beard | |
| 5,626,098 A * | 5/1997 | Askins et al. | 119/474 |
| 5,669,331 A | 9/1997 | Richmond | |
| 6,131,534 A | 10/2000 | Axelrod | |
| 6,192,834 B1 | 2/2001 | Kolozsvari | |
| 6,345,591 B1 | 2/2002 | Richmond | |
| 6,523,499 B1 | 2/2003 | Chrisco et al. | |
| 6,681,720 B1 | 1/2004 | Skurdalsvold | |
| 6,883,463 B2 * | 4/2005 | Link | 119/474 |
| 7,021,242 B2 | 4/2006 | Axelrod | |
| 7,025,019 B2 | 4/2006 | Axelrod | |
| 7,201,116 B2 | 4/2007 | Axelrod | |
| 7,347,164 B2 | 3/2008 | Axelrod | |
| 7,455,032 B2 | 11/2008 | Axelrod | |
| 8,127,719 B2 * | 3/2012 | Jakubowski et al. | 119/499 |
| 8,267,048 B2 * | 9/2012 | Flannery et al. | 119/498 |
| 2003/0116098 A1 | 6/2003 | Chrisco et al. | |
| 2005/0034679 A1 * | 2/2005 | Link | 119/474 |
| 2006/0107903 A1 | 5/2006 | Jin | |
| 2006/0174841 A1 * | 8/2006 | Axelrod | 119/498 |
| 2010/0089336 A1 * | 4/2010 | Flannery et al. | 119/498 |
| 2012/0186530 A1 * | 7/2012 | Cantwell et al. | 119/474 |

* cited by examiner

*Primary Examiner* — Anthony Stashick
*Assistant Examiner* — Brett Edwards
(74) *Attorney, Agent, or Firm* — Volpe and Koenig, P.C.

(57) ABSTRACT

A crate is provided with a base, sides, front, and back that form an enclosure. The front includes and opening and a door positioned within the opening in the closed position. The door is hung by hinges, which are associated with uninterrupted rails on the top of the crate. To open the crate, the bottom of the door is swung outward and upward to pivot the door toward the horizontal position on the hinges. Then, the door can be slid into the enclosure along the uninterrupted guides. The door may also include locks that can secure the door in the closed position. Both of the sides or both the front and back can be releasably connected with the top and pivotable into the base. After both sides or both the front and back are pivoted into the base, the remaining walls and top can be pivoted to fold into the base as a unit.

20 Claims, 21 Drawing Sheets

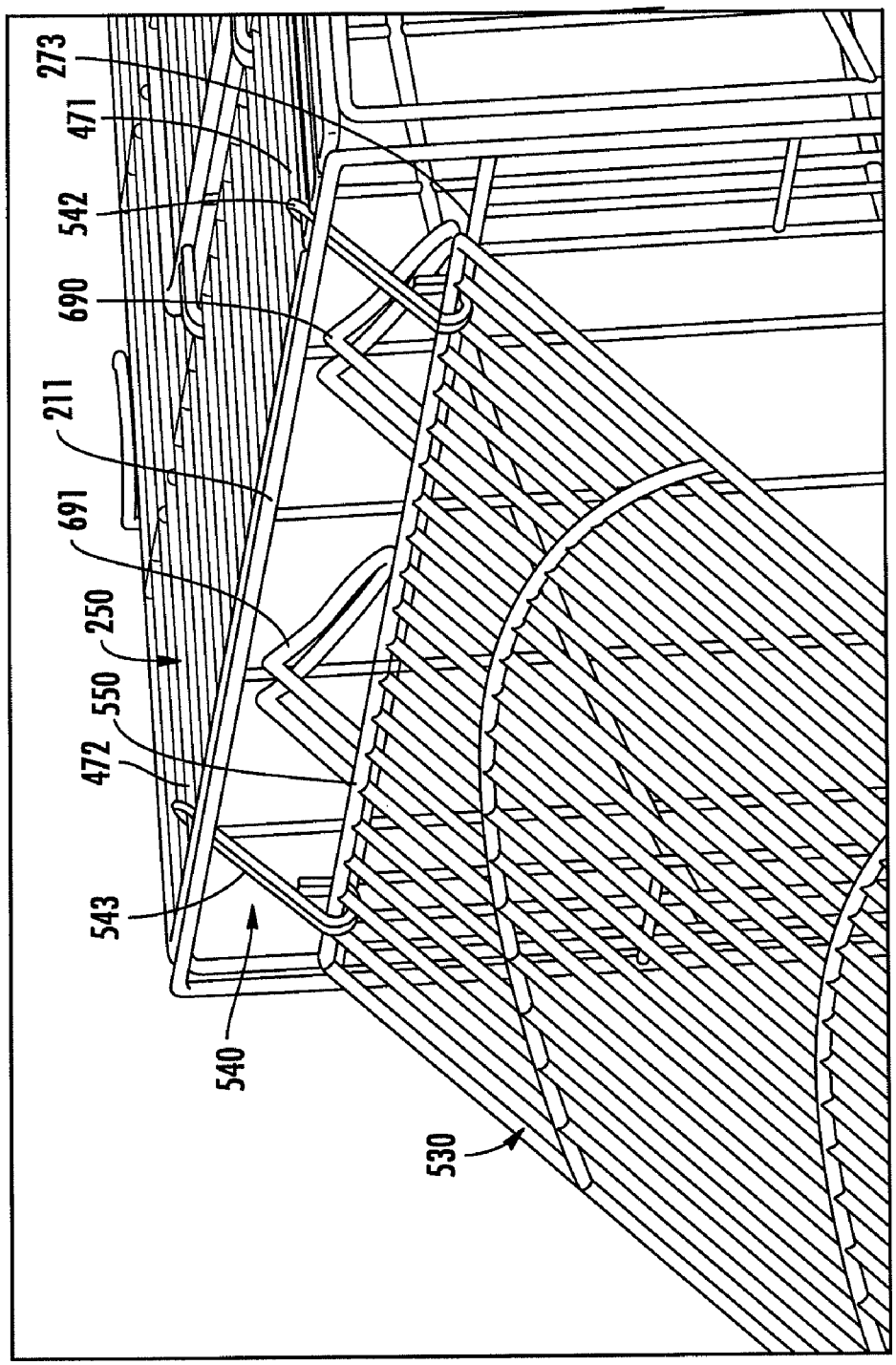

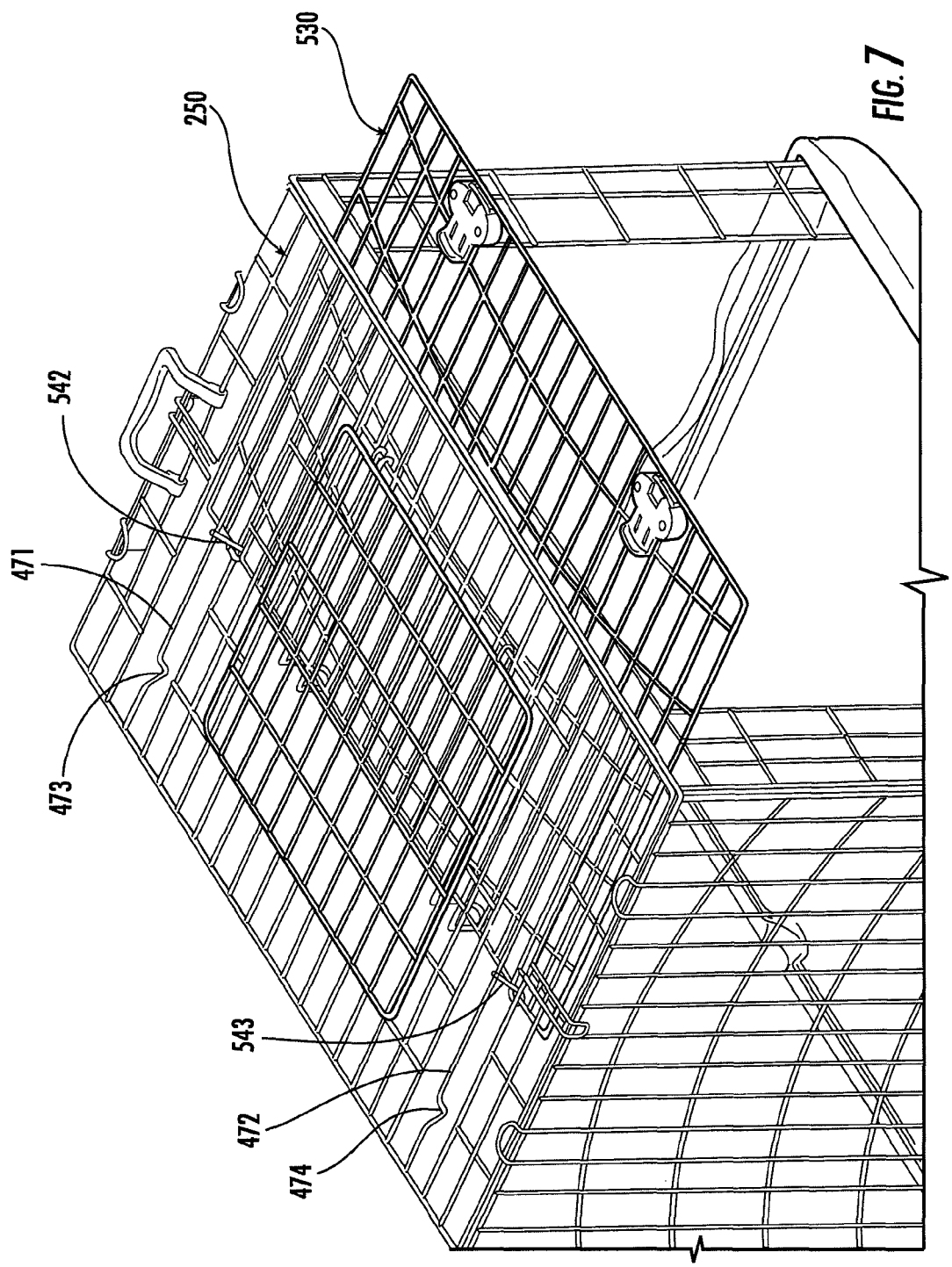

CRATE WITH BLOW-MOLDED BASE

CROSS REFERENCE TO RELATED APPLICATION

This application claims the benefit of U.S. provisional application No. 61/151,892, which was filed on Feb. 12, 2009 and which is incorporated by reference herein as if fully set forth.

FIELD OF INVENTION

The invention herein relates to crates that may be used as pet crates.

BACKGROUND

There are millions of pets in the United States. This results in part from the belief that pets help children to grow up. It also results in part from the companionship which pets offer to people of all ages. Many of these pets reside inside of their owners' homes. This is particularly true of cats since cats are fastidious in their habits. Many of these pets, however, reside outside of the home in places such as the backyards or garages of their owners. For example, pets that produce stronger odors, such as ferrets or rabbits, can be placed on a porch, rather than in the interior of a pet owner's home.

To constrain pet movement, pet owners often desire to place their pets inside a housing. For example, pets can be placed in housings to protect them from running into traffic. Housings can also stop pets from mixing with other animals or annoying guests. In some instances, pets destroy the pet owner's property by chewing or scratching items when unsupervised. For these and other reasons, pet housings are commonly used by pet owners for carrying or containing their pets both inside and outside of the home. Pet housings can also double as sleeping quarters for the pet in the home or on trips.

SUMMARY

In one aspect, the invention relates to a crate having a base, a top, a first side, a second side, a front having a door, and a back, where the base, top, first side, second side, front, and back form an enclosure. The base has a base first side, base second side, base front, and base back. The top has a top first edge, top second edge, top front edge, and top back edge. The first and second sides have respective bottom edges associated with the base first side and base second side, respectively. The first and second sides also have respective top edges associated with the top first and second edges, respectively. The back has a back top edge and a back bottom edge associated with the top back edge and the base back, respectively. The front has a front top edge and a front bottom edge associated with the top front edge and the base front, respectively. The front further includes a left side, right side, and a horizontal wire below the front top edge. The horizontal wire extends from the right side to the left side and a gap is formed between the front top edge, right side, horizontal wire, and left side. Further, an opening is formed between the horizontal wire, right side, front bottom edge, and left side. The top has first and second uninterrupted guides extending in a direction from the top front edge to the top back edge and generally perpendicular to the plane of the front. The first uninterrupted guide is closer to the first side than the second uninterrupted wire. The door has first and second hinges extending from the door and associated with the first and second uninterrupted guides, respectively. The door is positioned in the opening in a closed position with the first and second hinges extending from outside the enclosure, through the gap, and to the uninterrupted guides. The front of the enclosure is opened by pivoting the door upward and outward and sliding the first and second hinges toward the top back edge along the first and second uninterrupted guides.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 6 is an enlarged view of the wire crate with blow molded base from the front showing a door and an enlarged view of hinges.

FIG. 7 is an enlarged view of the wire crate from the top with the door partially within the enclosure made by the wire crate.

DETAILED DESCRIPTION OF THE PREFERRED EMBODIMENTS

Figure 1A:
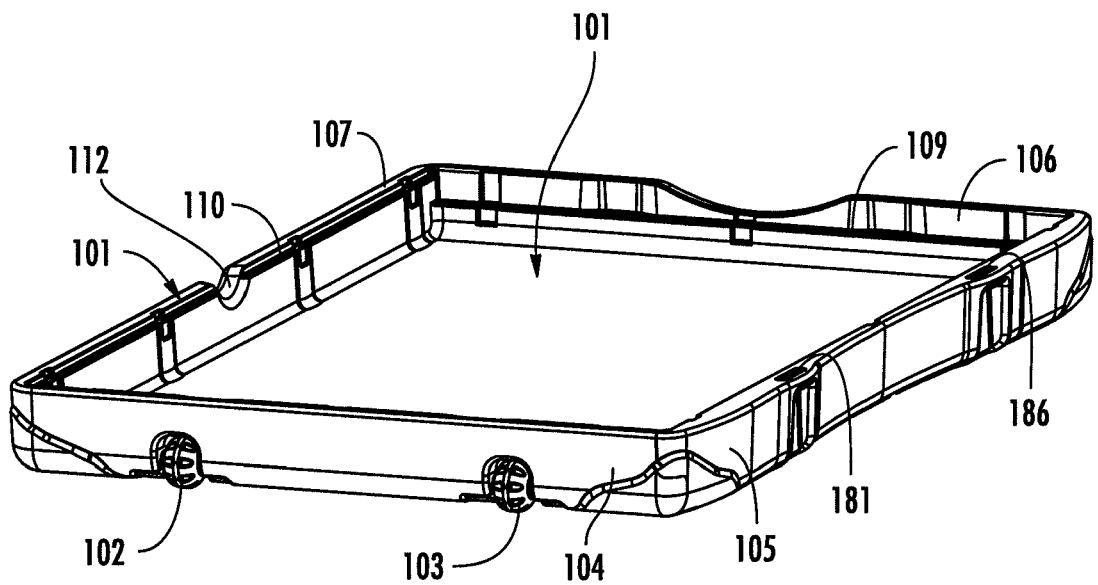
FIG. 1A illustrates a blow molded base from a first side viewing into the interior bottom of the blow molded base.

Certain terminology is used in the following description for convenience only and is not limiting. The words "right,"

"left," "top," and "bottom" designate directions in the drawings to which reference is made. The words "a" and "one," as used in the claims and in the corresponding portions of the specification, are defined as including one or more of the referenced item unless specifically stated otherwise.

As used herein, an "uninterrupted guide" refers to an uninterrupted wire or uninterrupted rail. Uninterrupted wires and rails are described below.

Figure 9:
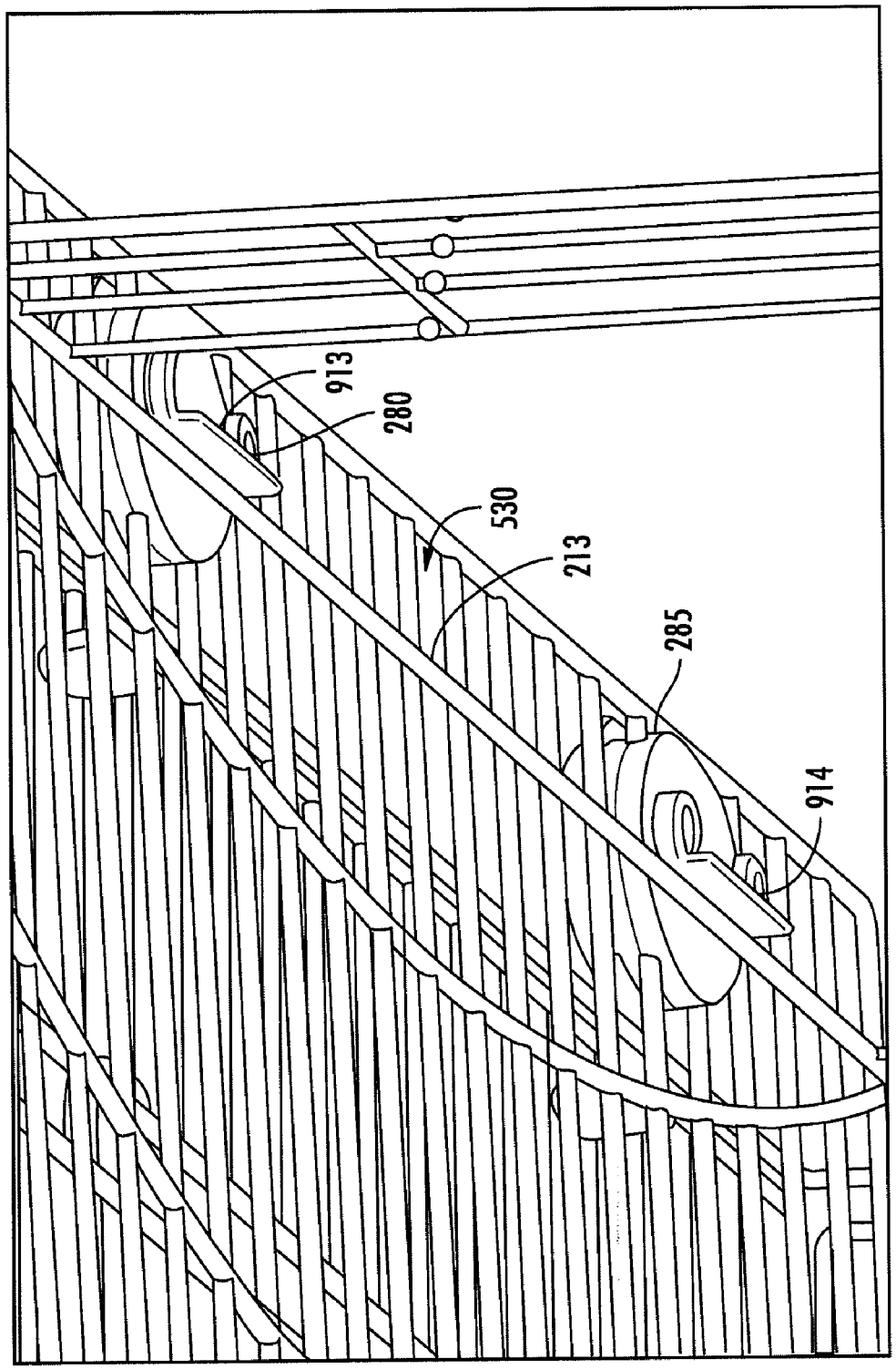
FIG. 9 is an enlarged view of the wire crate from within the enclosure toward the top front of the crate and with the door in a fully open position.
Figure 10:
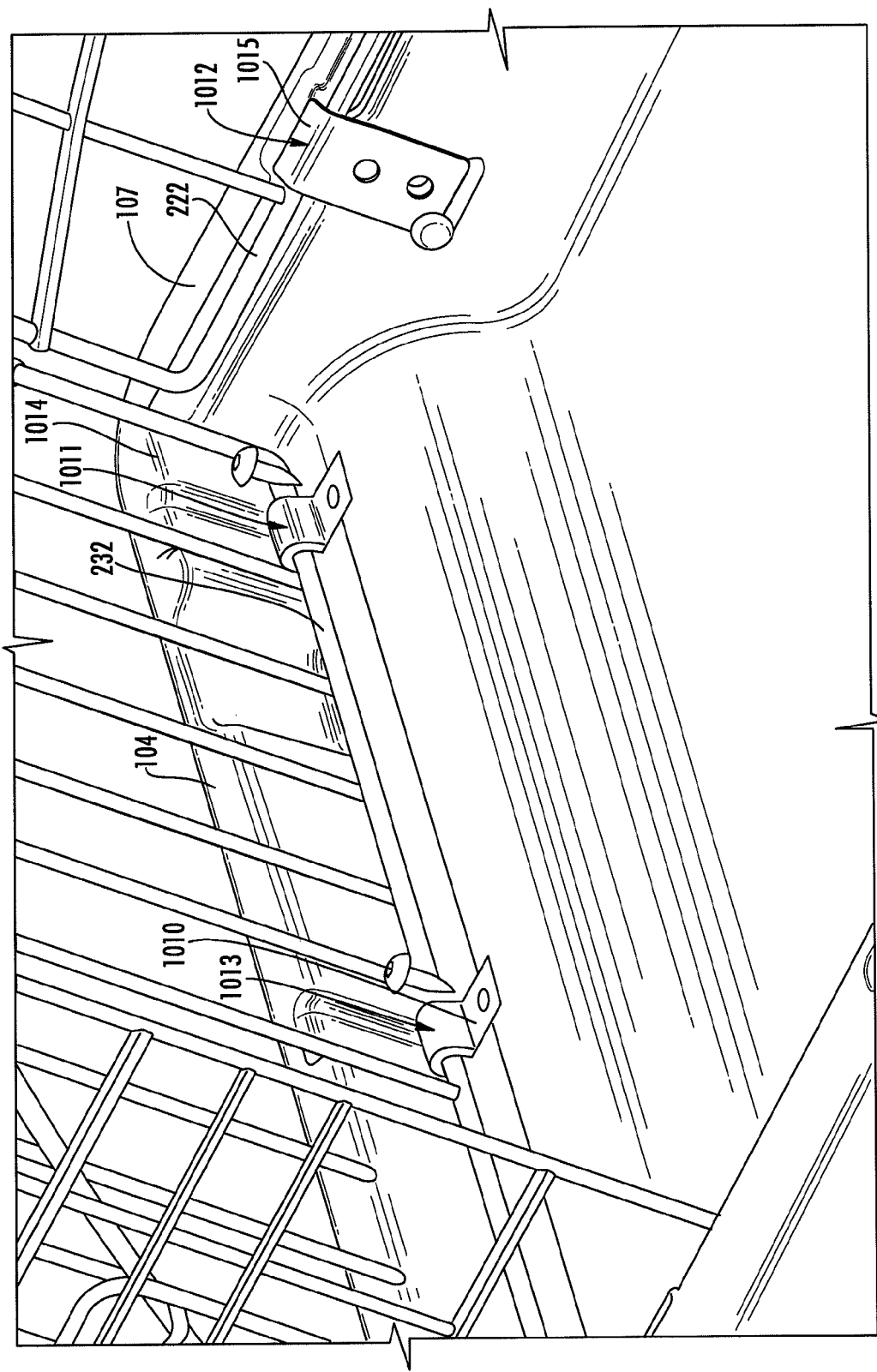
FIG. 10 illustrates a preferred connection of the walls of the wire crate.
Figure 11A:
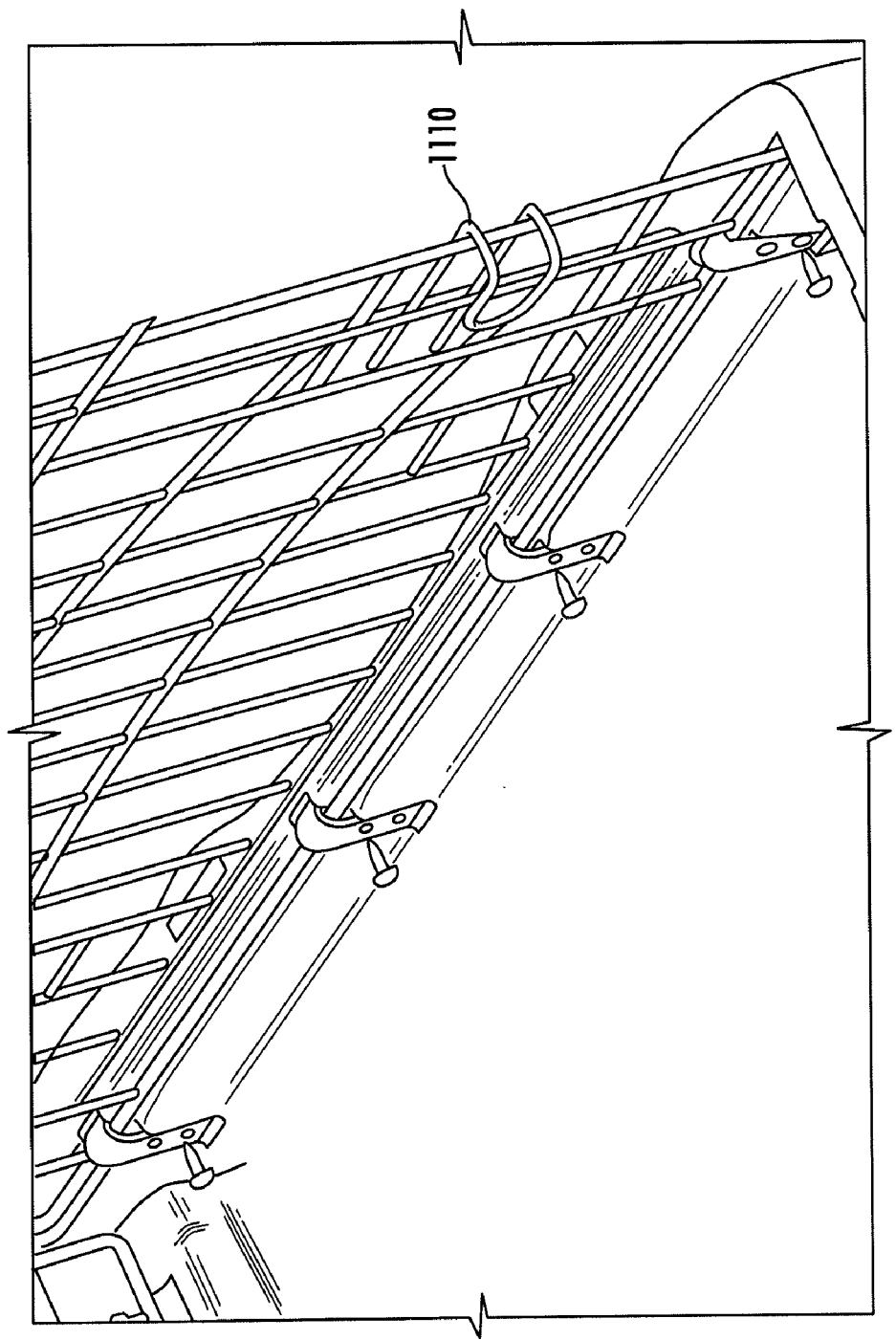
FIGS. 11A and 11B illustrate additional side supports for a preferred embodiment of the wire crate.
Figure 11B:
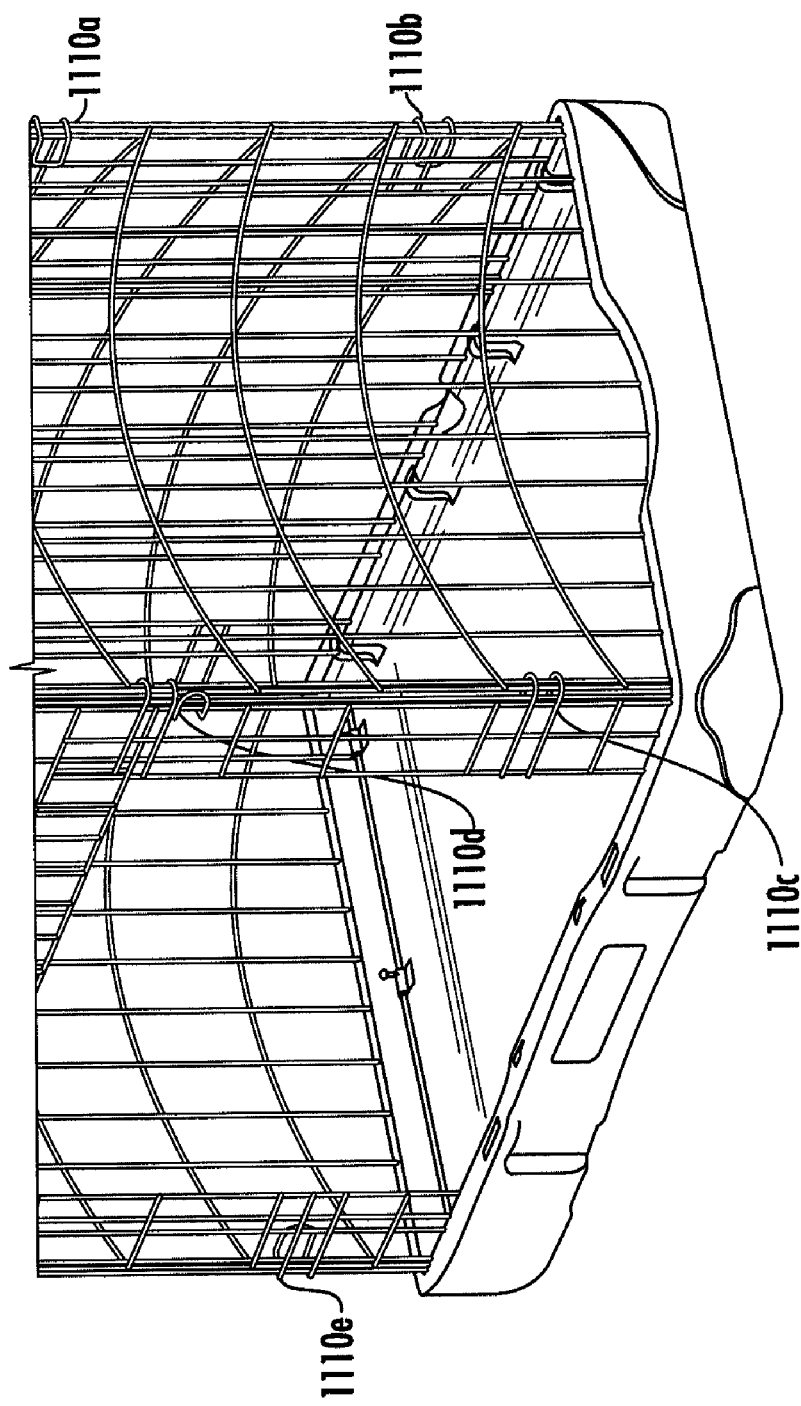

FIGS. 1A, 1B, 2A, 2B, 2C, 2D, 2E, and 3-9 illustrate a preferred embodiment of a wire crate with blow molded plastic base. FIGS. 10, 11A, and 11B illustrate features that can be used in connection with the wire crate with blow molded plastic base. The crate can be configured in various sizes and shapes but in the embodiments depicted, the crate has rectangular walls, a rectangular top, and a rectangular base.

Figure 1B:
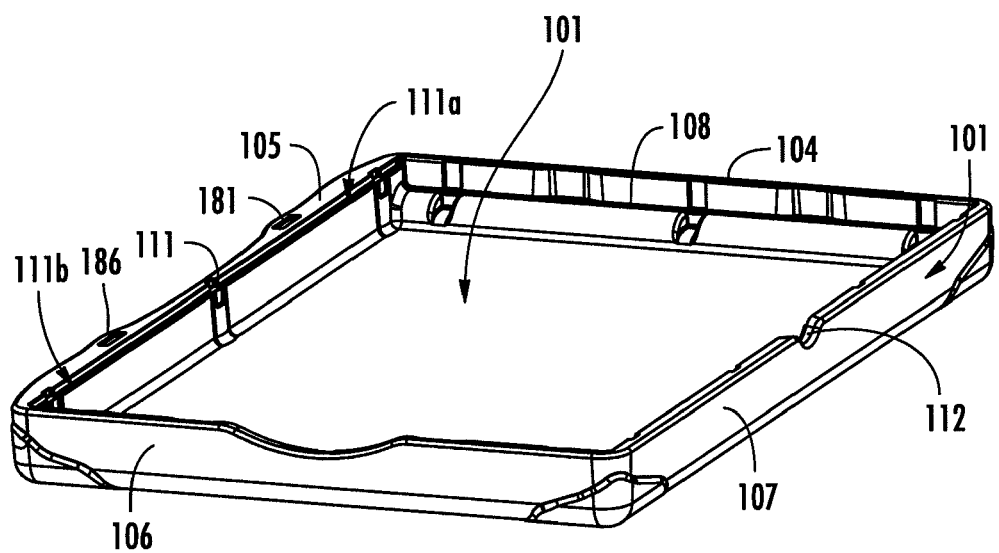
FIG. 1B illustrates the blow molded base from a second side viewing into the interior bottom of the blow molded base.

Referring to FIGS. 1A and 1B, a blow molded base 101 for a wire crate is illustrated. The blow-molded plastic base 101 includes wheels 102, 103 located at the lower first side of the base 101. First side wall 104, front wall 105, second side wall 106, and rear base wall 107 extend upward from the bottom of base 101. An optional depression 112, which is discussed with respect to FIG. 2G, below, is located in the center of rear base wall 107. Interior ledges 108, 109, 110, 111 extend along the length of the interior surfaces of base walls 104, 106, 107, 105 respectively, and provide a site for associating an enclosure wall to the base. The interior ledges 110, 111 are positioned higher on the interior surface of respective base walls 107, 105 than are the interior ledges 108, 109 on the respective side base walls 104, 106. The different heights of the interior ledges allow for compact folding of the wire crate, as described below. Slots 181, 186 in the base wall 105 can engage locks configured to secure a door in a front wire grate to the base 101.

Although the embodiment illustrated includes two wheels 102, 103 on one side of the base 101, alternative embodiments are contemplated with zero to any number of wheels on one or more sides of the base. In addition, other friction lowering devices including, but not limited to, skis or runners could be utilized in place or in addition to wheels. Also, the base can be provided without wheels or other friction lowering devices.

Referring to FIGS. 2A-2D, the wire crate with blow molded base 200 is illustrated in different views with particular walls removed for clarity. In FIG. 2E, the assembled wire crate with blow molded base 200 is illustrated. Front, back, first side, and second side wire walls 210, 220, 230, 240, respectively, are arranged around the interior of the base walls of the blow molded plastic base 101. The wire crate illustrated also includes a top 250 with a top door 260. The wire walls 210, 220, 230 and 240 project downward from the top 250 edges 251, 252, 253, 254, respectively. In addition, through the association of the wire wall bottom edges 212, 222, 232, 242 to the base interior ledges 111, 110, 108, 109, respectively, an enclosure is formed.

The first and second side wire walls 230, 240 are parallel to one another and perpendicular to the front 210 and back 220 side wire walls. The front and back side wire walls 210, 220 are parallel to one another. Edges 251, 252, of the top 250 are associated with the top edges 211, 221 of the front and back walls 210, 220, respectively. This association is preferably a pivotable connection and the pivotable connection can be, but is not limited to, any kind of hinged attachment. Edges 253, 254 of top 250 are proximal to and are releasably connectable to the first and second side walls 230, 240, respectively. In the embodiment illustrated, rounded clips 255, 256, 257, 258 and top clips 295, 296 releasably connect the first and second side walls 230, 240 with the top 250. In an alternate embodiment, the edges 253, 254 and first and second side walls are non-releasably connected with one another, and the rounded or top clips could be omitted.

Locks 280, 285 are located on the front door (see FIG. 5, door 530) and can engage slots 181, 186 in base 101. The embodiment depicted includes two locks but alternative embodiments may include no locks, one lock or more than two locks. Since the locks are positioned on the door and engage slots in the base, the locks could be configured to provide structural stability to the crate when the door is in the closed position.

A handle 297 is illustrated on a top corner of the wire crate. However, a handle can be located anywhere on the wire crate with blow molded base. For example, in an alternate embodiment, a handle is located on the side 106 of the base, which is opposite the wheels 102, 103.

Figure 2A:
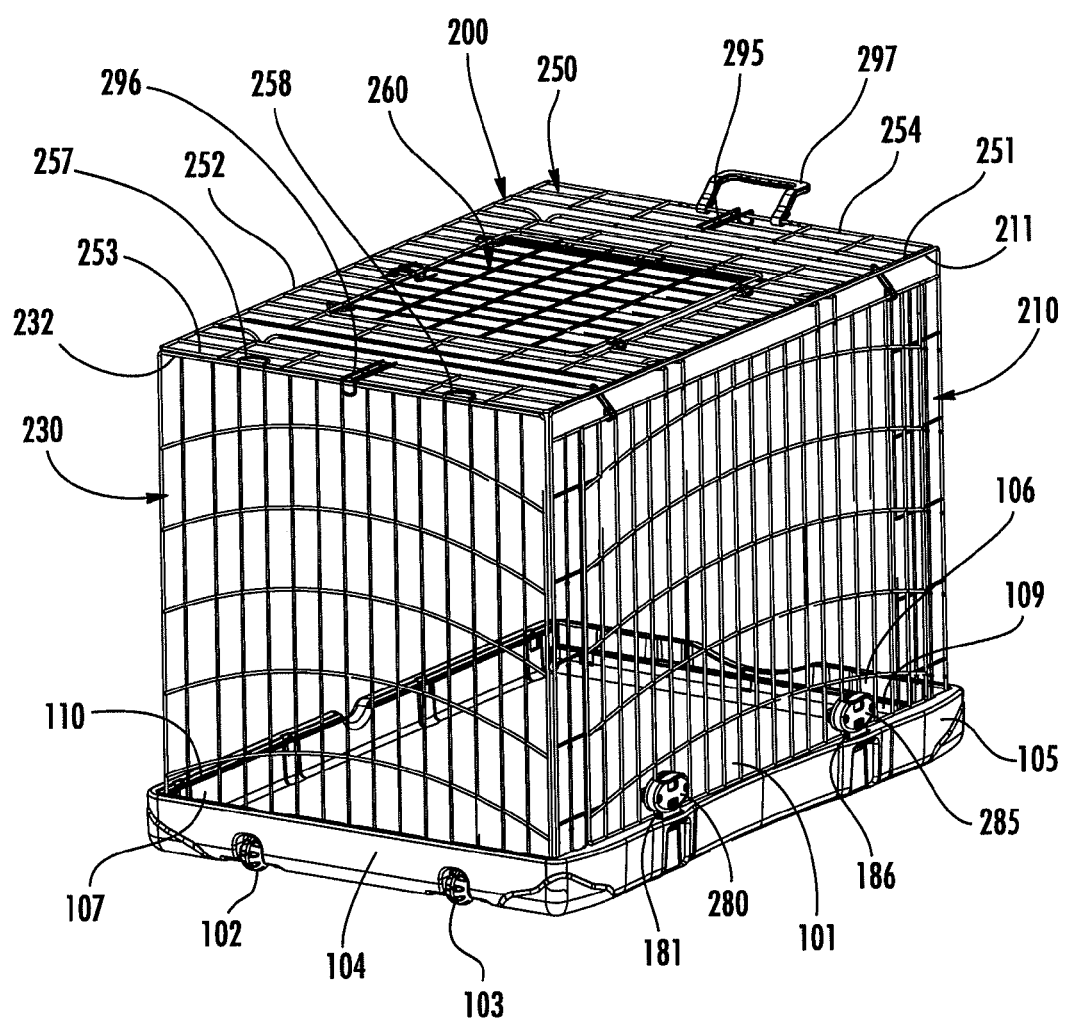
FIG. 2A illustrates a wire crate with blow molded base from a front perspective view with the front door closed and the back and second side walls removed.
Figure 2B:
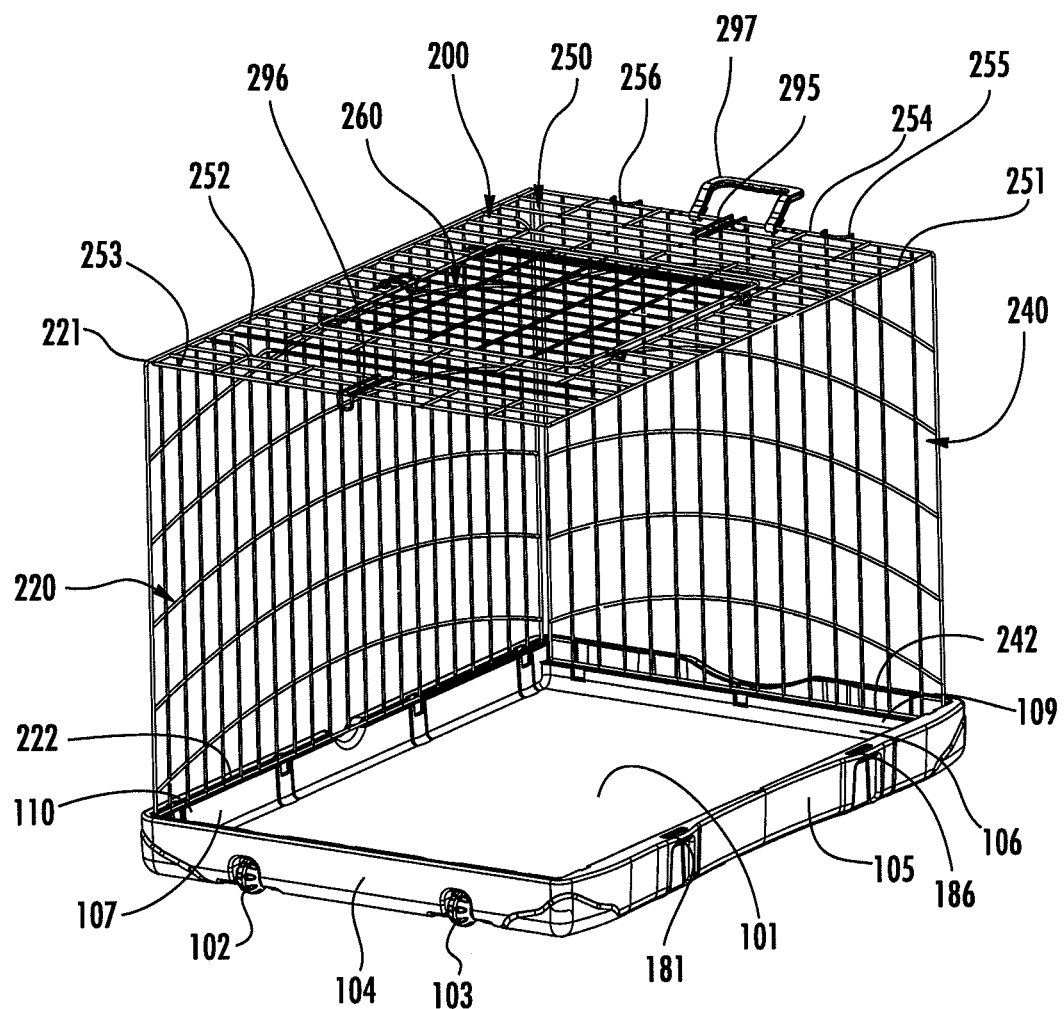
FIG. 2B illustrates the wire crate with blow molded base from a front perspective view with the front and first side walls removed.
Figure 2C:
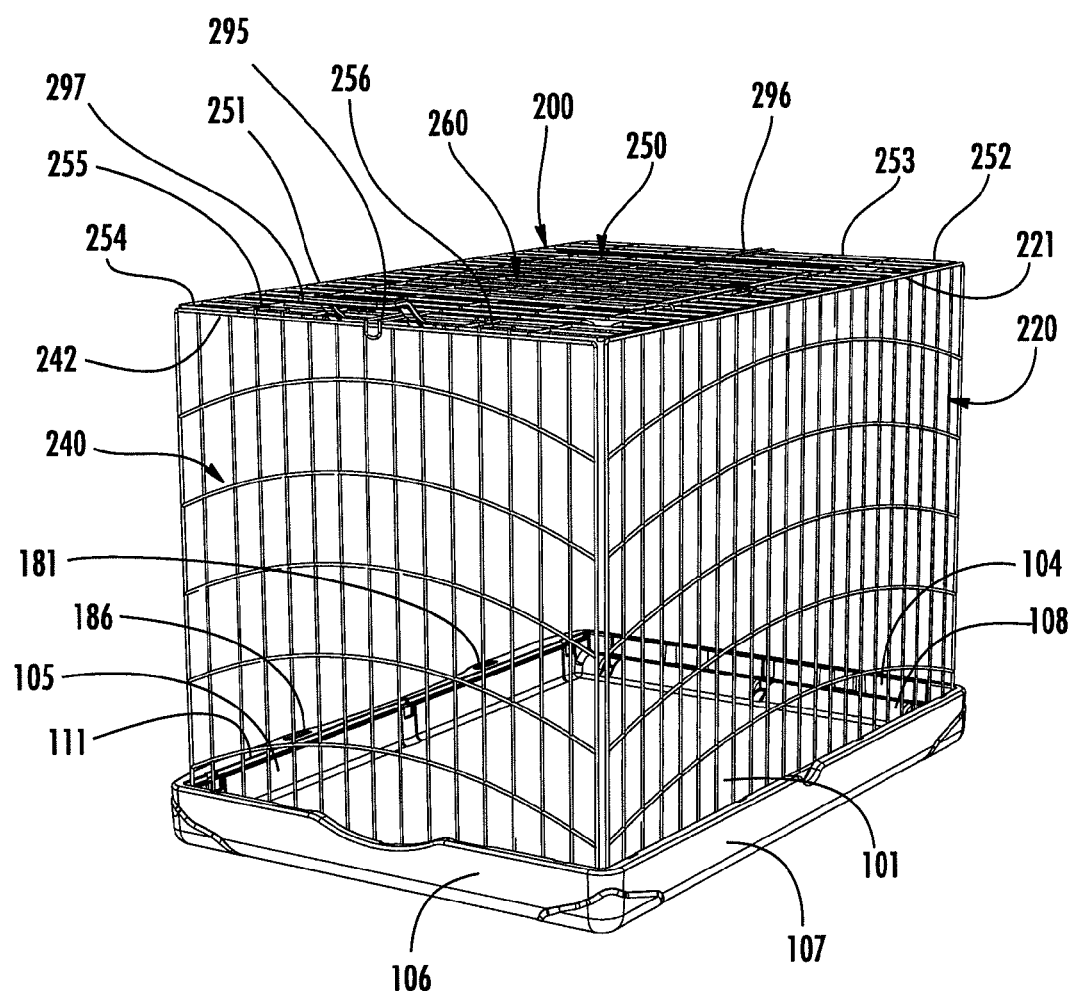
FIG. 2C illustrates the wire crate with blow molded base from a rear perspective view with the front and first side walls removed.
Figure 2D:
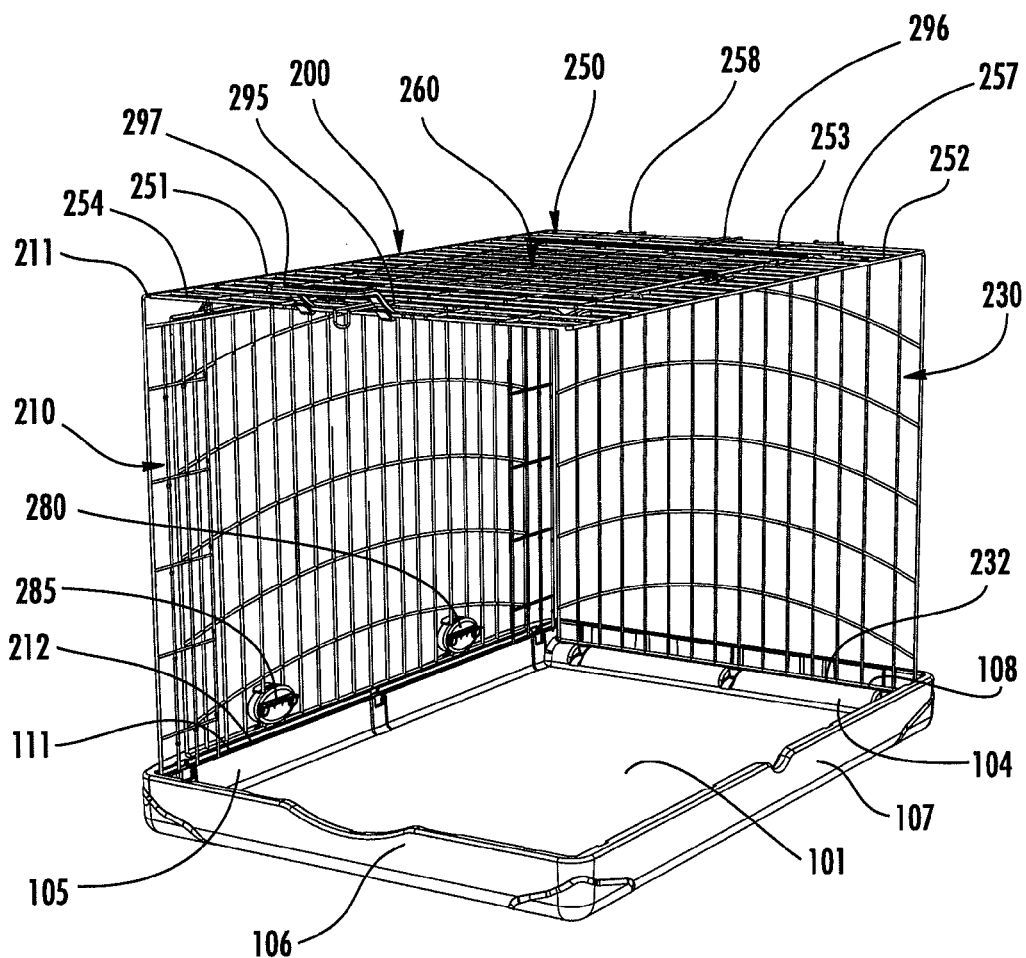
FIG. 2D illustrates the wire crate with blow molded base from a rear perspective view with the front door closed and the back and second side walls removed.
Figure 2E:
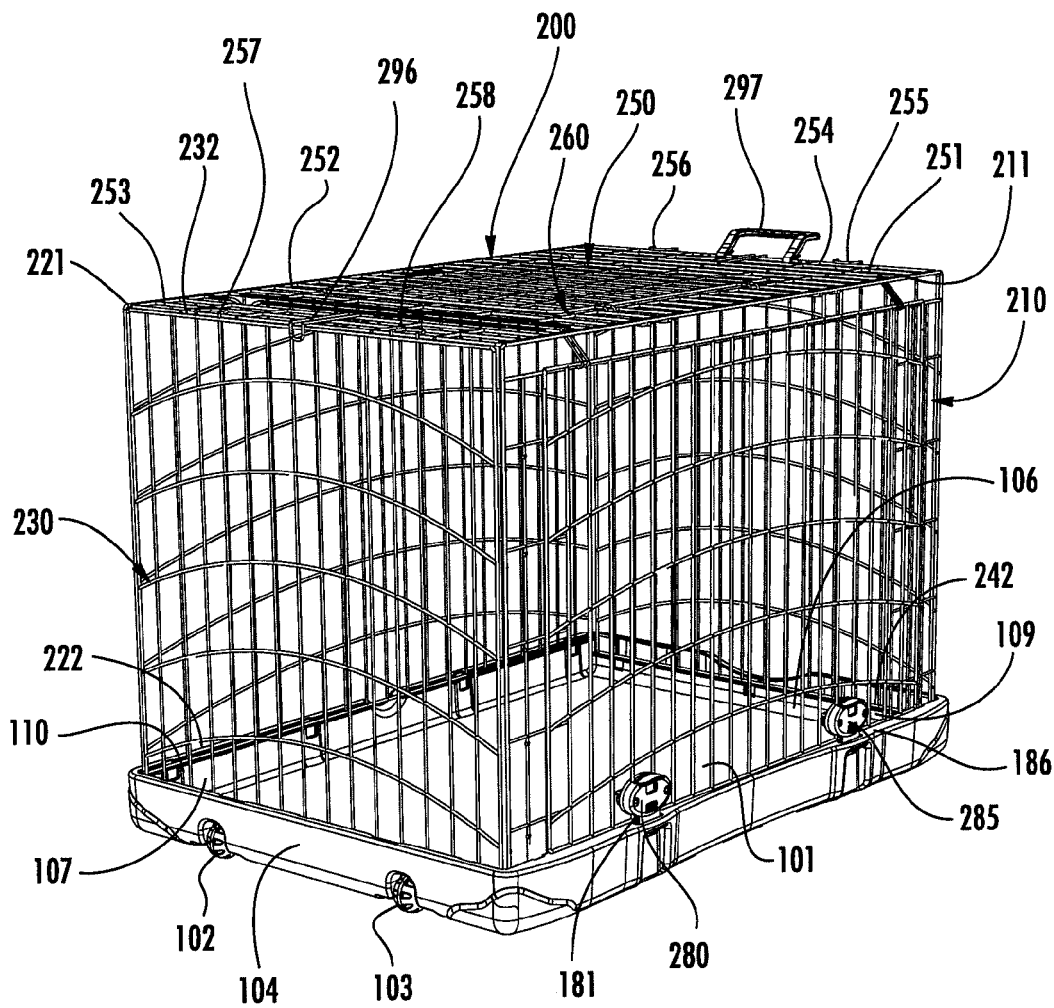
FIG. 2E illustrates the wire crate with blow molded base from a front perspective view with the front door closed.

As illustrated in FIG. 2B, the bottom edges 222, 242 of the wire walls 220, 240 are associated with the rear base wall 107 interior ledge 110 and the second base wall 106 interior ledge 109, respectively. Referring to FIG. 2D, the bottom edge 232 of the first wire wall 230 is associated with the first base wall 104 interior ledge 108. In addition, the bottom edge 212 of the front wire wall 210 is associated with front base wall 105 interior ledge 111. The bottom edges 212, 222, 232, 242 are associated to the interior ledges 111, 110, 108, 109, respectively, preferably through a pivotable connection. The base 101, however, is not required to include interior ledges and the bottom edges 212, 222, 232, 242 can be associated, preferably pivotably connected, with the tops or sides of respective base walls. In a further alternative, one or more base wall may be absent and the respective wire wall bottom edge can be associated, preferably pivotably connected, to the base at or near the appropriate side of the base. Any of the pivotable connections described above can be, but are not limited to, any kind of hinged attachment.

The front, back, side walls and top of the crate 200 are preferably collapsible into the base 101. To collapse the crate 200, the top wires 231, 241 of the side wire walls 230, 240 can be flexed to unhook the top clips 295, 296 from each of the edges 253, 254 of the top 250. Further, rounded wire clips 255, 256, 257, 258 can be unhooked from the top 250 by flexing the top wires 231, 241 of the side wire walls 230, 240. Once the side wire walls 230, 240 are unhooked they can be folded inwardly into the base 101. The front 210, top 250 and back 220 can then be folded flat by moving the back 220 toward the base 101 and allowing the front 210 to pivot forward so that the top 250 collapses against the front 210 once the back 220 has been lowered into the base 101. The front 210 and top 250 are then pivoted as a unit back on top of the back 220 to achieve a compact configuration.

In an alternate embodiment, the front and back wire walls 210, 220 are releasably connected with the edges 251, 252 while the first and second side walls are pivotably connected with edges 253, 254. In this alternate embodiment, top clips would be positioned to extend over the front and back, instead of the side wire walls. Further, clips would extend from the front and back and over the respective top edges, rather than from the side wire walls. In this embodiment, the wire crate would collapse by disconnecting the front and back wire walls 210, 220 from the top 250, pivoting them inward into the base 101, pivoting one side wire wall into the base, and then pivoting the other side wall and top 250 as unit back on top of the side wall already in the base. As described below, hinges connect a door on the front wire wall 210 to the top 250. In this alternate embodiment where the front is releasably connected with edge 251, the door hinges are releasably connected with the top 250 or the door and disconnected from the top 250 or the door prior to pivoting the front wire wall 210 into the base 101.

Figure 2F:
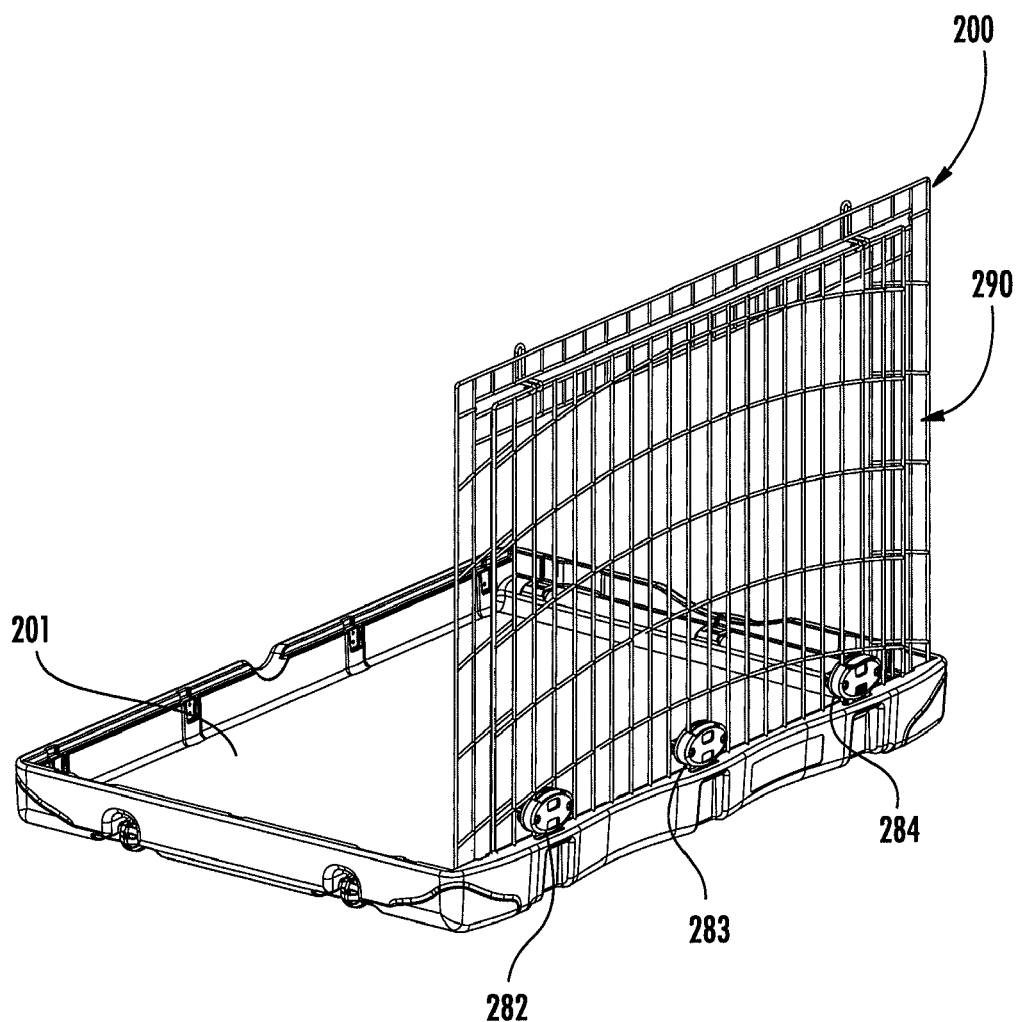
FIG. 2F illustrates the wire crate with blow molded base from a front perspective view with the front door closed and the top and first, second, and rear walls removed.

Referring to FIG. 2F, a further embodiment is illustrated where the front wire wall 290 and base 201 engage in an alternate arrangement. As depicted, the base 201 includes slots 281, 282, 283, which engage locks 287, 288, 289 on front wall 290. The remaining parts are similar to the prior embodiment.

Figure 2G:
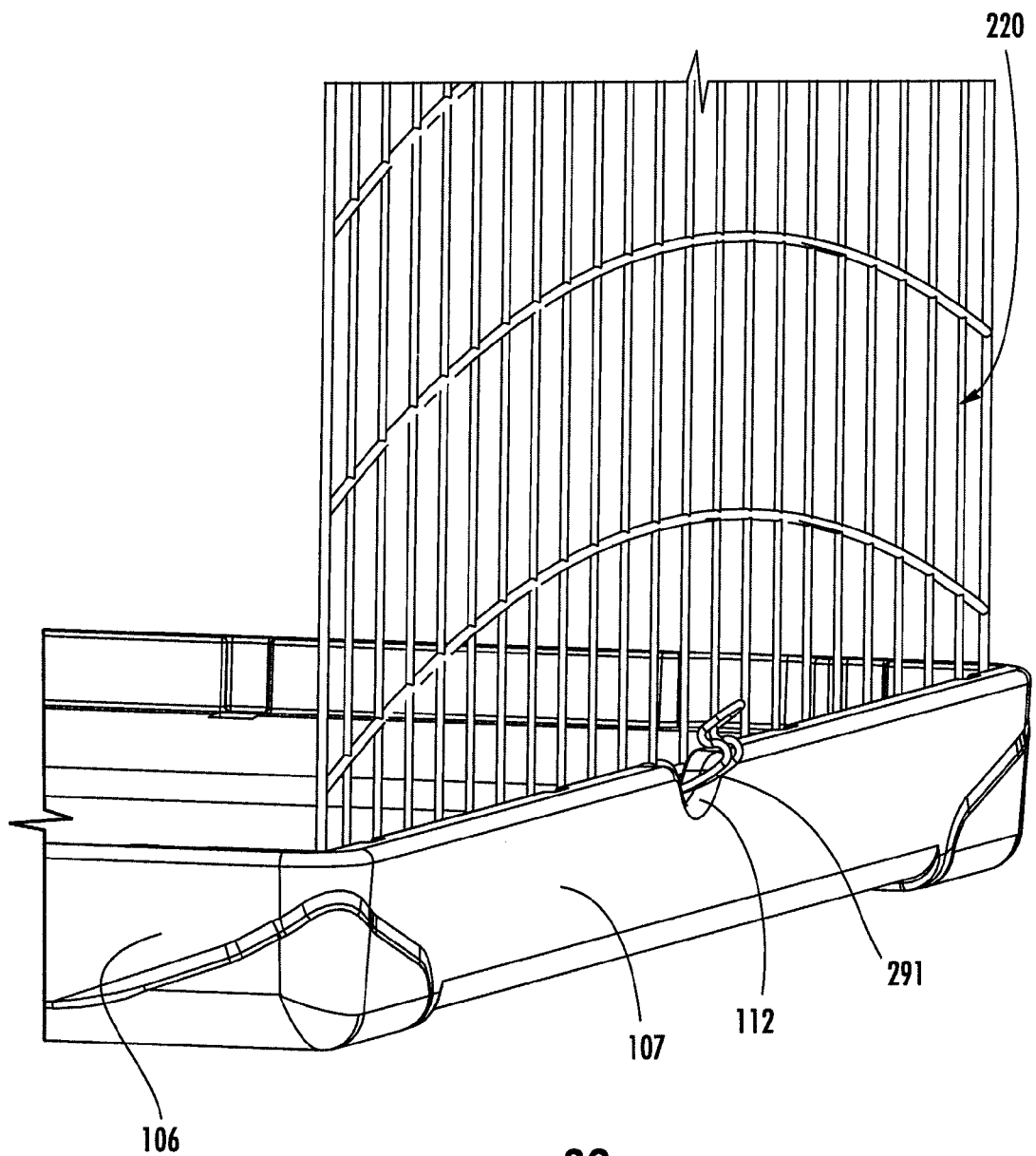
FIG. 2G is an enlarged view of the wire crate with blow molded base with the top and front, first, and second side walls removed.

Referring to FIG. 2G, the wire walls can be held in the collapsed position via a clip 291 positioned on back wire wall 220 at the base, which extends from the rear base wall clip receiving area 112. Once collapsed, the clip 291 engages over the front edge 251 of the top 250 and/or the top edge 211 of the front 210, holding the crate in the collapsed position. The clip 291 is pivotable on the bottom edge 222 of the back wall 220.

Figure 3:
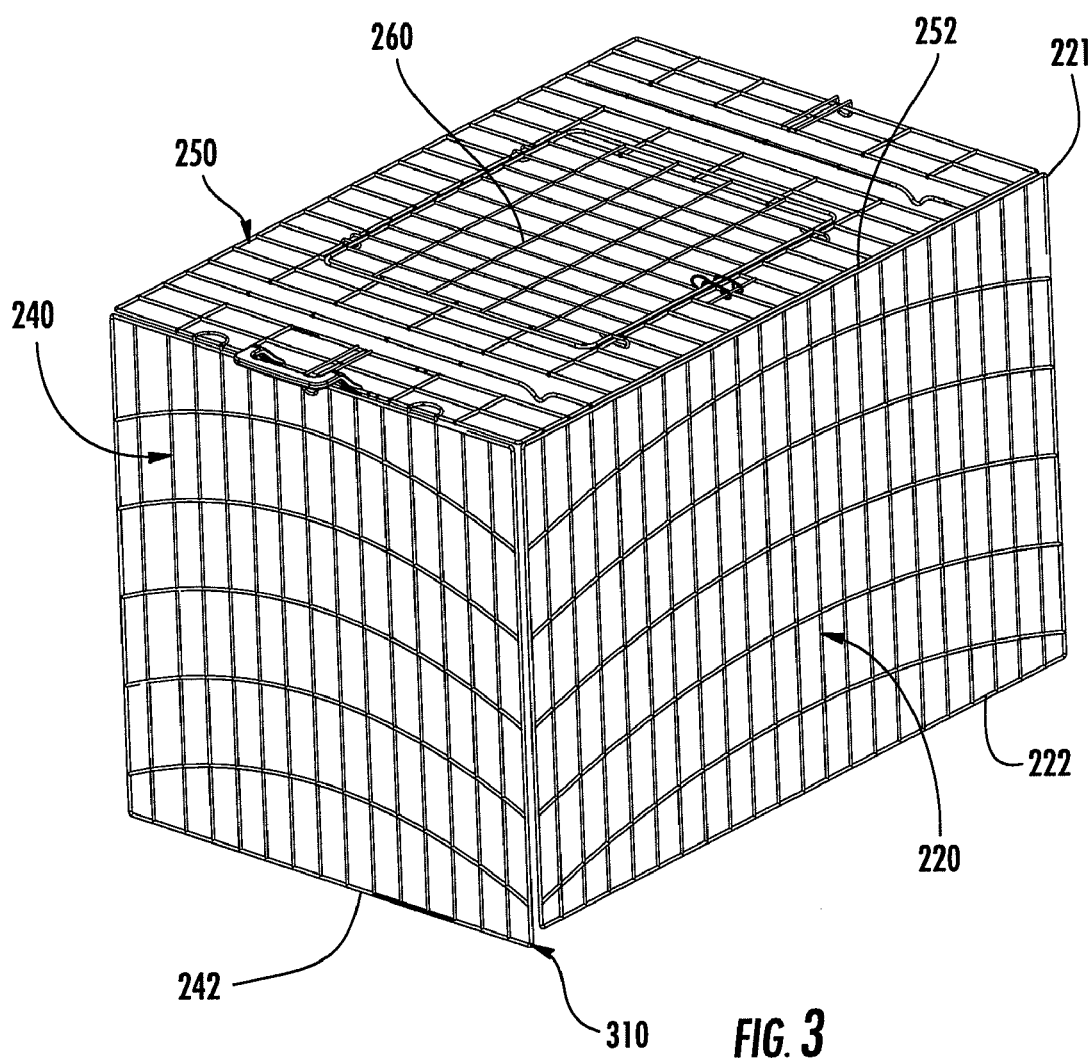
FIG. 3 illustrates a back wall, second side wall, and top of the wire crate with blow molded base from a rear view.

Referring to FIG. 3, the back wire wall 220 is illustrated along with the top 250 and the second side wire wall 240. As illustrated, side wire wall 240 extends farther into the base (not shown) at point 310 than the back wire wall 220. Although not shown in FIG. 3, the first side wire wall 231 similarly extends farther into the base than the back wire wall 220. Further the first and second wire walls 230, 240 extend farther into the base than front wire wall 210. Because side wire walls 230, 240 extend farther into the base, the bottom edges 232, 242 can pivotably engage the lower internal ledges 108, 109. The back and front wire wall 220, 210 bottom edges 222, 232, however, engage higher internal ledges 110, 111. This arrangement facilitates folding the sides and the front and back walls into the collapsed position. For folding, the side wire walls 230, 240 are positioned lower in the base than the top 250, the front 210 and the back 220. The height of bottom edges 232, 242, 222, 232 can be adjusted by including spacers between the respective bottom edges and internal ledges. The spacers may also be a part of different sizes of pivotable connections. The different sizes of pivotable connections could set, or contribute to, the height of the respective bottom edges.

In an alternate embodiment, the internal ledges 108, 109, 110, 111, are at the same height within the base 101. In this embodiment, the height of bottom edges 212, 222, 232, 242 could be adjusted relative to one another by one or more spacers between the respective internal ledge and bottom edge. As described above, in one embodiment, one or more base wall may be absent and the respective wire wall bottom edge 212, 222, 232, 242 can be pivotably connected to the base at or near the appropriate side of the base. In this embodiment, the height of bottom edges 212, 222, 232, 242 could be adjusted relative to one another by one or more spacers between the respective site of association and bottom edge.

Figure 4:
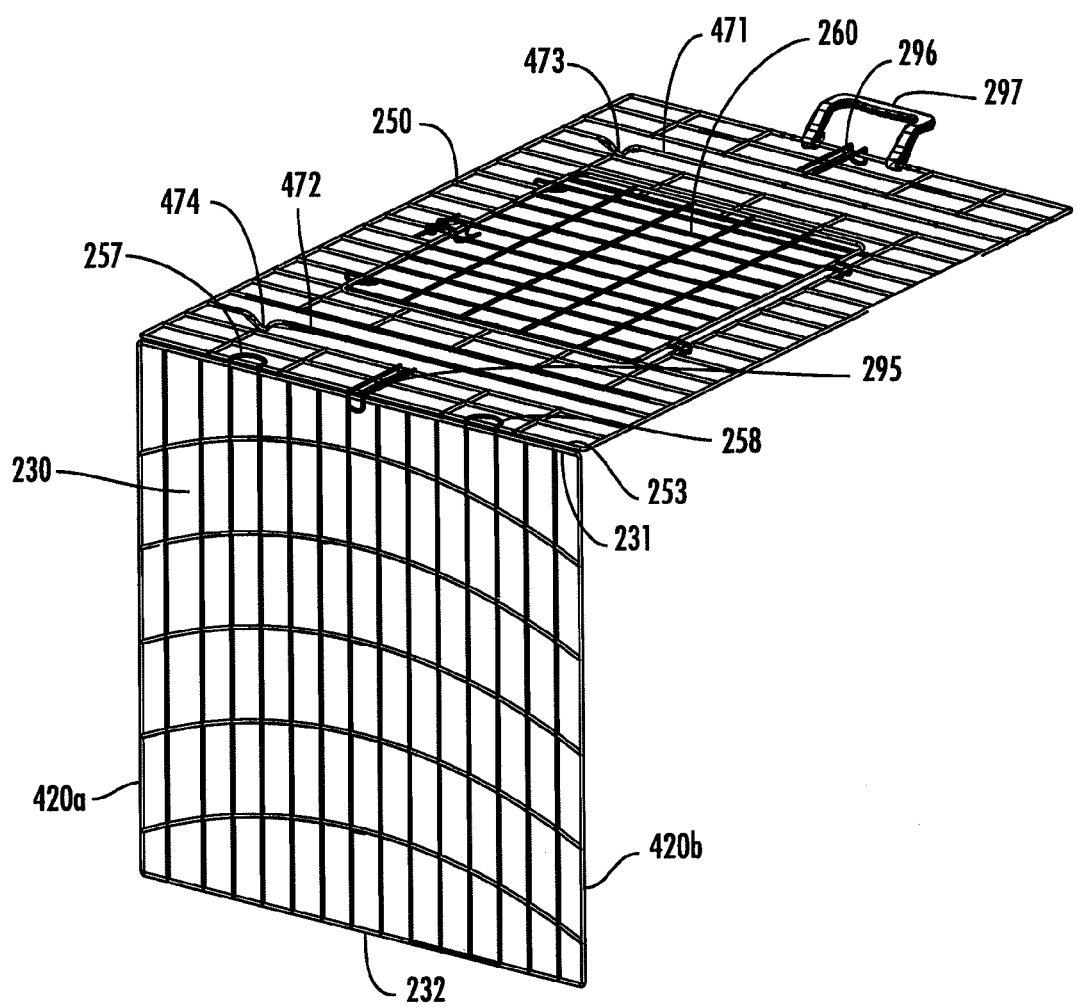
FIG. 4 illustrates a first side wall and top of the wire crate from a first side view.

Referring to FIG. 4, the first side wall 230 and top 250 of the wire crate are illustrated. Horizontal wires are distributed between the top 231 and bottom 232 wires of the side wall 230. Preferably, the horizontal wires are evenly spaced apart from one another. Vertical wires are distributed between the first 420a and last 420b vertical wires and are preferably evenly spaced between one another. The vertical and horizontal wires can be fixed to one another at their junctions to prevent a pet from pushing the wires apart and escaping from the wire crate. Preferably, the wires are fixed at the junction by the pressure asserted by the respective wires against one another. Alternatively, the wires can be fixed to one another by being welded, integral with one another, or through a weave of the vertical and horizontal wires. The horizontal and vertical wires can be straight or curved. The wire grate of each wall and the top is similarly configured.

As illustrated in FIG. 4, the top 250 also includes uninterrupted wires 471, 472 having depressions 473, 474. The uninterrupted wires 471, 472 extend in a direction from the top front edge 251 to the top back edge 252 and perpendicular to the plane of the front wire wall 210. As described below, uninterrupted wires 471, 472 engage door hinges for the front door 530 and provide for movement in a sliding manner. The uninterrupted wires 471, 472 only need to be uninterrupted for the slide length realized for the door hinges to allow the majority of the door to be stored beneath the top. It is possible for the uninterrupted wires to deviate from a path that is perpendicular to the plane of the front wire wall 210 as long as the hinges can slide along the uninterrupted wires 471, 472. Generally perpendicular contemplates arrangements of uninterrupted wires that are exactly parallel to the plane of the front wall those that deviate but allow the hinges to slide along the uninterrupted wires.

Figure 5A:
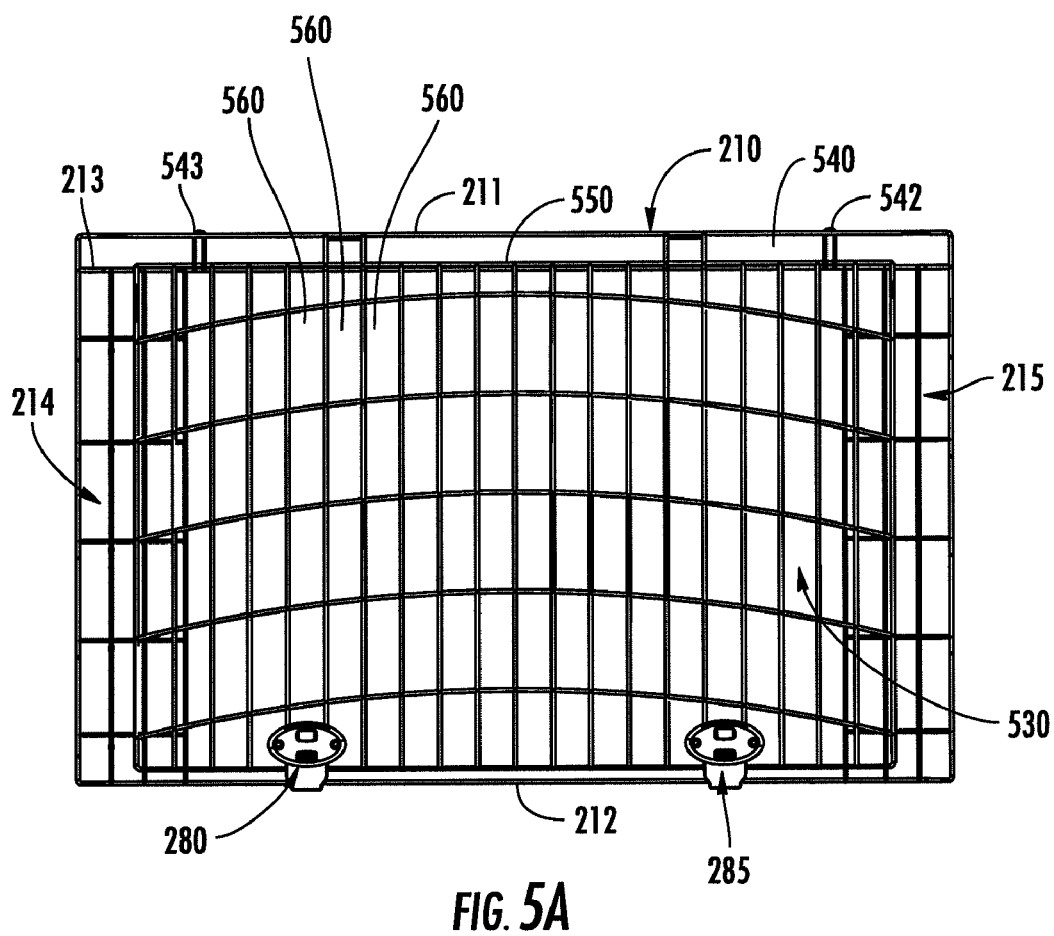
FIG. 5A illustrates a front wall of the wire crate.
Figure 5B:
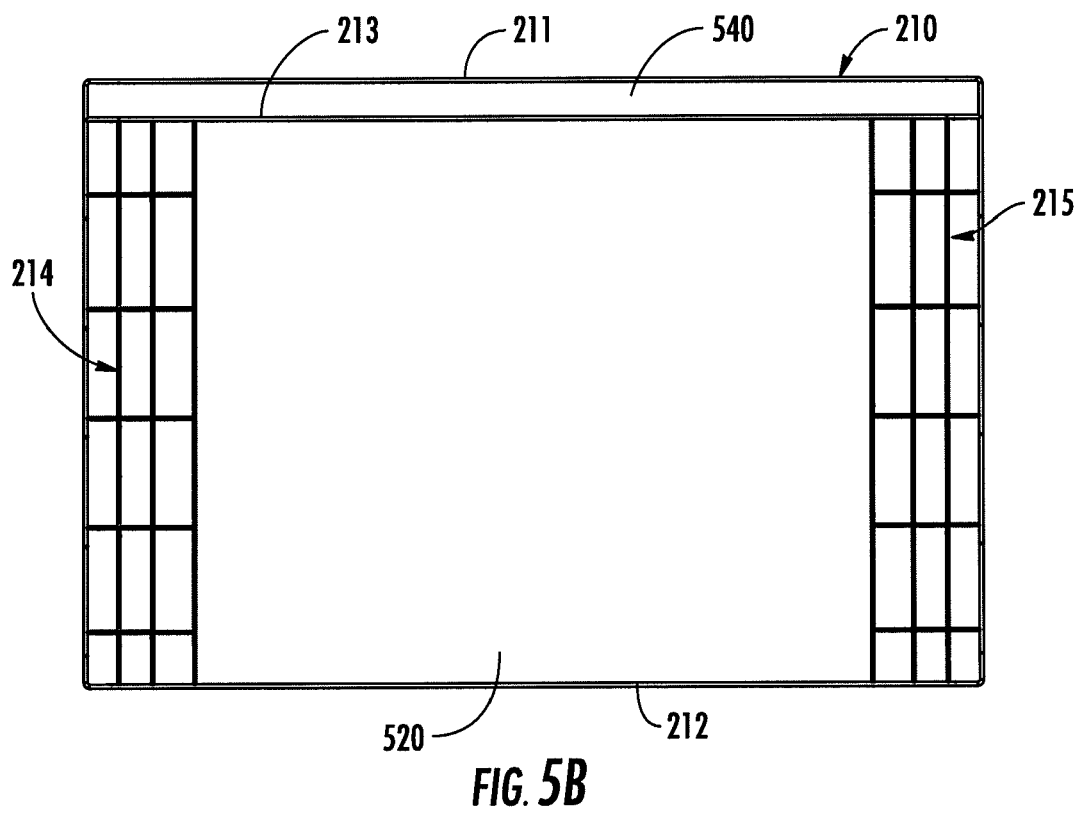
FIG. 5B illustrates a front wall of the wire.
Figure 5C:
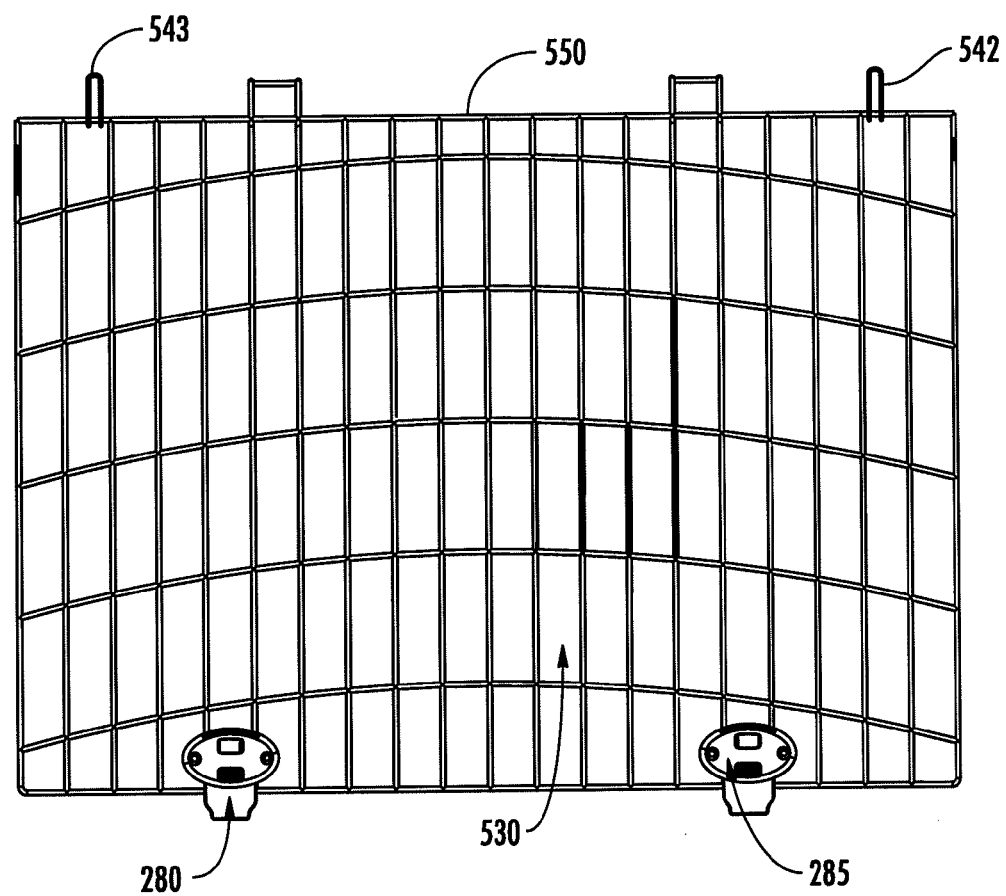
FIG. 5C illustrates the door of the wire crate.

Referring to FIGS. 5A-5C, the front wire wall 210 is illustrated. FIG. 5A illustrates the front wire wall 210 with a door 530, FIG. 5B illustrates the front wire wall 210 without the door 530, and FIG. 5C illustrates the door 530. The front wire wall 210 includes the door 530, sides 214, 215, the top edge 211, a horizontal wire 213, and the bottom edge 212. The door 530 has a door top edge 550. The sides 214, 215, the horizontal wire 213 and the bottom edge 212 form an opening 520 in the front wire wall 210. A gap 540 is formed between wires 211 and 213. The door 530 is positioned to close the opening 520, and the door 530 can be pivoted upward on hinges 542, 543 to reveal the opening 520. The door 530 occupies the major portion of the front wall such that when the door is fully open, substantially the entire front of the wire crate 200 is open for ingress and egress of a pet. Locks 280 and 285 are positioned on the lower portion of door 530 and are configured to engage slots 181, 186 on the front wall 105 of the base 101, shown in FIGS. 1A and 2A.

The bottom edge 212 is adapted to engage interior ledge 111 of the front base wall 105. See also FIG. 2D. In another embodiment, bottom edge 212 runs only along the first and second sides 214, 215 of the front wire wall 210 and is engaged with the base 101 only on the sides of interior ledge 111. Alternatively, each side 214, 215 of the front wall 210 can be supported on separate peripheral interior ledges located in areas 111a, 111b of the base 101. See FIG. 1B. In another embodiment, one or more of any of the interior ledges may be discontinuous. FIG. 5A also illustrates interspersed holes 560 within the door 530.

As shown in FIG. 6, the door 530 pivots on the two hinges 542, 543. Preferably, the hinges 542, 543 are closed wires located at the top edge 550 of the door 530 and each closed wire loops around the uninterrupted wires 471, 472, respectively. Alternatively, the hinges can be open loops or otherwise releasably connected with the uninterrupted wires 471, 472 or door 530. As shown in FIG. 6, stops 690, 691, pivot with the door and away from the top 250 when the door 530 is opened. In the closed position, see FIG. 2A, the stops 690, 691 are proximal or abut the underside of the top 250 such that the door cannot be displaced upward far enough to allow an enclosed pet to escape. As the door 530 is pivoted upward, the hinges 542, 543 can be slid inward along uninterrupted wires 471, 472. As the hinges slide inward, the door can be raised to a horizontal position and slid into the gap 540 between the front top edge 211 and horizontal wire 213, and beneath top 250.

Hinges 542, 542 are depicted associated with door top edge 550. One or more hinges, however, can be associated with the door at the door top edge 550 or other door points such that the one or more hinges can be associated with uninterrupted rails and the door can be slid through the gap 540.

Referring to FIG. 7, the wire crate 200 is illustrated with the door in an intermediate position between open and closed. As shown in FIG. 7, and also FIG. 4, no intersecting wire or other blocking structure intervenes between the door hinges 542, 543 and depressions 473, 474 along uninterrupted wires 471, 472. Because there are no intersecting wires or blocking structures, hinges 542, 543 can slide along uninterrupted wires 471, 472 from the front of the top 250 to the depressions 473, 474. Here it is clearly understood that the term "uninterrupted" refers to the portion of the wires 471, 472 along which the door hinges 542, 543 slide, and crossing wires or reinforcements can be connected to the uninterrupted wires 471, 472 outside of this area. Through this sliding mechanism, the sliding door can be slid into the enclosure, allowing unobstructed storage with the door in the open position. This allows the door to be stowed in an open position where it does not extend outwardly into the room but the wire crate is still configured, in that position, to allow easy ingress and egress from the crate, when desired. Alternative embodiments of the wire crate with blow molded base include a sliding door having any mechanism by which the door slides into the enclosure.

Figure 8:
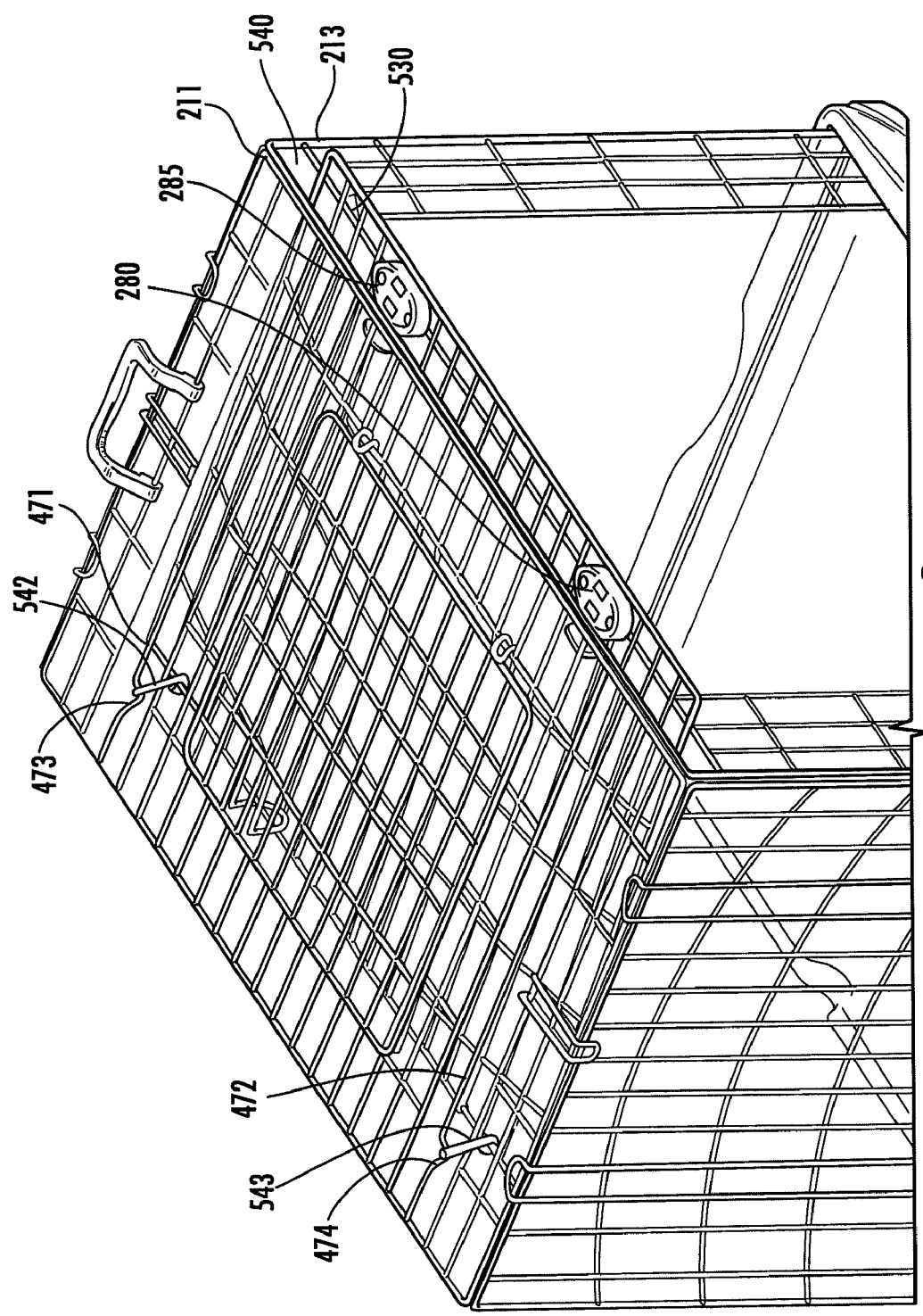
FIG. 8 is an enlarged view of the wire crate with from the top with the door in a fully open position.

Referring to FIG. 8, the door 530 is illustrated in the fully open position. The door locks 280, 285 are partially within the gap 540 and the hinges 542, 543 are in the depressions 473, 474. The depressions 473, 474 can slow or prevent the rearward movement of the door 530 as it is opened. As shown in FIG. 9, the door locks 280, 285 can rest on horizontal wire 213. Further, stops 913, 914 can be provided on the locks 280, 285 such that the stops 913, 914, and therefore the door 530, cannot be pushed past horizontal wire 213. Stops 913, 914 can be positioned as illustrated in FIG. 9 but a stop could also be placed anywhere on one or more locks such that a stop contacts the front of the wire crate when the door is in the open position. For example, the stops could be positioned on the exterior side of the locks when in the closed position. In this configuration, the stops could contact a portion of the front above the door or the top front edge.

Referring to FIG. 10, preferably brackets 1010, 1011, and 1012 are fixed to base walls 104, 107. The brackets include loops 1013, 1014, and 1015 that extend around and enclose the bottom wires 232, 222 of the walls. Through the brackets, the front, back, and side wire walls can be hinged to the base. Any number of brackets can be provided. Although a bracket is illustrated as the hinged attachment in FIG. 10, any kind of hinged attachment is contemplated.

Referring to FIGS. 11A and 11B, additional side supports can be optionally provided. The additional side supports are structures configured to releasably connect a side wall with the front or back walls. As shown in FIG. 11A, the additional side support 1110 is a loop of wire extending from the back wall. In FIG. 11B, further additional side supports 1110a-1110e are illustrated with the side walls in position. Any number of additional side supports may be utilized.

Although the embodiments illustrated in the drawings include a wire crate with blow molded base, alternative embodiments are envisioned where the mesh of the walls and/or top is made of a material other than wire. For example, instead of or in addition to wires, the structure of the walls and top can be rails comprised of polymeric resin, plastic, wood, resin composites or any other material capable of withstanding the pressure provided by the crate or exerted by a pet occupying the crate. Further, the mesh may include one or more individual wires or rails made of different materials than the other wires or rails. The base may also be provided in alternative materials, including but not limited to wires, metal, wood, fabric, cardboard and paper. Any base edge or wall can include structures such as posts or slots, which can engage support structures for a wire crate. In further alternative embodiments, the walls and top can be configured as solid panels or panels with one or more holes, such as interspersed holes 560. The holes may provide ventilation. The panels can be made of any suitable material such as, but not limited to metal, wood, fabric, cardboard and paper. When the top includes a panel, uninterrupted wires, or uninterrupted rails in place of one or more uninterrupted wire, can be maintained by providing open regions within the top panel. The open regions may be formed during fabrication of the panel, providing a cut-away portion of the panel after fabrication, or assembly of multiple panels into a top panel to leave an open region. Multiple panels can also form a top panel that is then cut-away at particular portions to leave the open regions. The uninterrupted wires or rails can be made integral with the panel or attached to the panel. Further, the uninterrupted wires or rails can be made of the same material as the panel(s) of the top or of a different material. As shown in FIG. 5A interspersed holes 560 are indicated within the door 530. The interspersed holes in the embodiment depicted are the spaces between the wires and, as illustrated in each of FIGS. 2A-11B, the wire crate includes interspersed holes in each of the wire walls and the top. When a panel is used, one or more interspersed hole may be provided as a hole in the panel. When a uninterrupted guide is a rail, rather than a wire, the configurations described above with respect to an uninterrupted wire apply to the uninterrupted rail.

It is understood, therefore, that this invention is not limited to the particular embodiments disclosed, but is intended to cover all modifications which are within the spirit and scope of the invention as defined by the appended claims.

What is claimed is:
1. A crate comprising:
a base, a top, a first side, a second side, a front having a door, and a back, wherein the base, the top, the first side, the second side, the front, and the back form an enclosure;
the base having a base first side, base second side, base front, and base back;
the top having a top first edge, top second edge, top front edge, and top back edge;
the first and second sides having respective bottom edges associated with the base first side and the base second side, respectively; the first and second sides having respective top edges associated with the top first and second edges, respectively;
the back having a back top edge and a back bottom edge associated with the top back edge and the base back, respectively; the front having a front top edge and a front bottom edge associated with the top front edge and the base front, respectively;
the front further including a left side, right side, and a horizontal wire below the front top edge, wherein the horizontal wire extends from the right side to the left side and a gap is formed between the front top edge, the right side, the horizontal wire, and the left side and wherein an opening is formed between the horizontal wire, the right side, the front bottom edge, and the left side;
the top having first and second uninterrupted guides extending in a direction from the top front edge to the top back edge and generally perpendicular to the plane of the front, the first uninterrupted guide closer to the first side than the second uninterrupted wire;

the door including first and second hinges extending from the door and associated with the first and second uninterrupted guides, respectively;

the door positioned in the opening in a closed position with the first and second hinges extending from outside the enclosure, through the gap, and to the uninterrupted guides, and is moveable to an opened position by pivoting the door upward and outward and sliding the first and second hinges toward the top back edge along the first and second uninterrupted guides.

2. The crate of claim 1, wherein the base is comprised of blow molded plastic.

3. The crate of claim 1, wherein one or more of the top, the first side, the second side, the front, the door, and the back are comprised of a wire grate.

4. The crate of claim 1, wherein the first and second side respective bottom edges are pivotably connected with the base first side and the base second side, respectively;

the first and the second side respective top edges are releasably connected with the top first and second edges, respectively;

the back top and bottom edges are pivotably connected with the top back edge and the base back, respectively; and the front top and bottom edges are pivotably connected with the top front edge and the base front, respectively.

5. The crate of claim 4, wherein the base includes a base first side wall with an interior and a first side interior ledge, the base first side wall rising from the base and extending along the base first side, the first side interior ledge extending along the interior of the base first side wall, and wherein the first side bottom edge engages the first side interior ledge;

a base second side wall with an interior and a second side interior ledge, the base second side wall rising from the base and extending along the base second side, the second interior ledge extending along the interior of the base second side wall, and wherein the second side bottom edge engages the first side interior ledge;

a rear base wall with an interior and a rear interior ledge, the rear base wall rising from the base and extending along the base back, the rear interior ledge extending along the interior of the rear base wall, and wherein the back bottom edge engages the rear interior ledge; and a front base wall with an interior and a front interior ledge, the front base wall rising from the base and extending along the base front, the front interior ledge extending along the interior of the front base wall, and wherein the front bottom edge engages the front interior ledge.

6. The crate of claim 5, wherein the back and front interior ledges are disposed higher on the interior of the back and front base walls than are the first side and second side interior ledges on the interior of the base first side wall and the base second side wall.

7. The crate of claim 5, wherein the front bottom edge is discontinuous and runs along the front right side and the front left side.

8. The crate of claim 7, wherein the front interior ledge is discontinuous and runs along regions proximal to the front bottom edge along the front right side and the front left side.

9. The crate of claim 5, wherein the front interior ledge is discontinuous and runs along regions proximal to the front right side and the front left side.

10. The crate of claim 5, wherein the base is comprised of blow molded plastic and the top, the first side, the second side, the front, the door, and the back are comprised of a wire grate.

11. The crate of claim 10, wherein the first and second uninterrupted guides are first and second uninterrupted wires of the wire grate.

12. The crate of claim 11, wherein the uninterrupted wires include first and second depressions proximal to the top back edge and wherein the first and second hinges can engage the first and second depressions when the door is the opened position.

13. The crate of claim 11, further comprising a lock disposed on the door proximal to the front bottom edge and the base first side wall further includes a slot adapted to engage the lock in a locked position.

14. The crate of claim 13, wherein the lock includes a stop, wherein the stop contacts the front when the door is in the open position.

15. The crate of claim 14, wherein the uninterrupted wires include first and second depressions proximal to the top back edge and wherein the first and second hinges can engage the first and second depressions when the door is in the open position.

16. The crate of claim 1, wherein the back and front respective bottom edges are pivotably connected with the base back and the base front, respectively;

the back and front respective top edges are releasably connected with the top back and the top front edges, respectively;

the first side top and bottom edges are pivotably connected with the top first side edge and the base first side, respectively; and the second side top and bottom edges are pivotably connected with the top second side edge and the base second side, respectively.

17. The crate of claim 1, wherein one or more of the top, the first side, the second side, the front, the door, and the back are made of a mesh comprising of one or more materials selected from the group consisting of wire, polymeric resin, plastic, wood, and resin composites.

18. The crate of claim 1, wherein one or more of the top, the first side, the second side, the front, the door, and the back are panels comprised of one or more materials selected from polymeric resin, plastic, wood, and resin composites, and wherein the top panel includes first and second open regions adapted to include the first and second uninterrupted guides, respectively.

19. The crate of claim 18, wherein one or more of the panels have one or more holes.

20. The crate of claim 18, wherein the first and second uninterrupted guides are integral with the material of the top panel.

* * * * *